(12) United States Patent
Tsuji et al.

(10) Patent No.: US 11,891,494 B2
(45) Date of Patent: Feb. 6, 2024

(54) ANTIMICROBIAL RESIN AND COATING MATERIAL

(71) Applicant: KIRIN HOLDINGS KABUSHIKI KAISHA, Tokyo (JP)

(72) Inventors: Toshikazu Tsuji, Tokyo-to (JP); Hideki Koizumi, Tokyo-to (JP); Akiko Jitsuhiro, Tokyo-to (JP); Yuki Konoeda, Tokyo-to (JP); Atsushi Hotta, Tokyo-to (JP); Tomoki Maeda, Ibaraki-ken (JP)

(73) Assignee: KIRIN HOLDINGS KABUSHIKI KAISHA, Tokyo (JP)

( * ) Notice: Subject to any disclaimer, the term of this patent is extended or adjusted under 35 U.S.C. 154(b) by 577 days.

(21) Appl. No.: 17/049,846

(22) PCT Filed: Apr. 25, 2019

(86) PCT No.: PCT/JP2019/017544
§ 371 (c)(1),
(2) Date: Oct. 22, 2020

(87) PCT Pub. No.: WO2019/208674
PCT Pub. Date: Oct. 31, 2019

(65) Prior Publication Data
US 2021/0363323 A1   Nov. 25, 2021

(30) Foreign Application Priority Data

Apr. 26, 2018   (JP) .................................. 2018-085008
Oct. 29, 2018   (JP) .................................. 2018-202864

(51) Int. Cl.
| A01N 25/10 | (2006.01) |
| C08L 39/04 | (2006.01) |
| C08K 5/00 | (2006.01) |
| C09D 5/14 | (2006.01) |

(52) U.S. Cl.
CPC ............ C08K 5/0058 (2013.01); A01N 25/10 (2013.01); C08L 39/04 (2013.01); C09D 5/14 (2013.01); C08L 2207/04 (2013.01)

(58) Field of Classification Search
CPC ........ A01N 25/10; A01N 33/12; A01N 43/50; A01N 43/54; C08F 112/08; C08F 4/04
See application file for complete search history.

(56) References Cited

U.S. PATENT DOCUMENTS

| 2014/0170238 A1* | 6/2014 | Cliff ........................ C09D 7/63 424/618 |
| 2017/0280725 A1* | 10/2017 | Jin ............................. A61F 6/08 |
| 2019/0137503 A1* | 5/2019 | Tsuji ......................... C08F 4/04 |
| 2021/0363323 A1* | 11/2021 | Tsuji ....................... A01N 25/10 |

FOREIGN PATENT DOCUMENTS

| CN | 1861648 A | 11/2006 | |
| EP | 3348648 A1 | 7/2018 | |
| JP | 2003-055108 A | 2/2003 | |
| JP | 2017-051113 A | 3/2017 | |
| JP | 2017051113 A * | 3/2017 | ........... A61K 9/5138 |
| JP | 2018-48267 A | 3/2018 | |
| JP | 2018-123061 A | 8/2018 | |
| JP | 2018-135312 A | 8/2018 | |
| WO | 2017/043484 A1 | 3/2017 | |
| WO | 2017057571 A1 | 4/2017 | |

OTHER PUBLICATIONS

International Preliminary Report on Patentability, dated Nov. 5, 2020, issued by The International Bureau of WIPO in International Application No. PCT/JP2019/017544.
Extended Search Report, dated Feb. 16, 2022, issued by the European Patent Office in European Patent Application No. 19791643.0.
Seiichi Uchiyama, et al., "A Cell-Targeted Non-Cytotoxic Fluorescent Nanogel Thermometer Created with an Imidazolium-Containing Cationic Radical Initiator", Angew. Chem. Int. Ed., Apr. 6, 2018, pp. 5413-5417, vol. 57.
Martino Colonna, et al., "Synthesis and characterization of imidazolium telechelic poly(butylene terephthalate) for antimicrobial applications", Reactive & Functional Polymers, 2012, pp. 133-141, vol. 72.
Qian Ye, et al., "Grafting poly(ionic liquid) brushes for antibacterial and anti-biofouling applications", Journal of Materials Chemistry, 2012, pp. 13123-13131, vol. 22.
International Search Report for PCT/JP2019/017544, dated Jul. 23, 2019 (PCT/ISA/210).

* cited by examiner

*Primary Examiner* — Peter A Salamon
(74) *Attorney, Agent, or Firm* — Sughrue Mion, PLLC

(57) ABSTRACT

Disclosed is an additive for imparting antimicrobial properties to a resin. The additive comprises a string polymer, at least one terminal of which has a positive charge, wherein the string polymer is a polymer containing structural units derived from a cationic polymerization initiator and a monomer containing a carbon-carbon double bond. By using this additive, it becomes possible to obtain an antibacterial resin molded body which can be prepared simply and inexpensively and which has high stability and safety.

26 Claims, No Drawings

ANTIMICROBIAL RESIN AND COATING MATERIAL

CROSS REFERENCE TO RELATED APPLICATIONS

This application is a National Stage of International Application No. PCT/JP2019/017544 filed Apr. 25, 2019, claiming priority based on prior patent applications filed in Japan: Japanese Patent Application No. 2018-85008 (filing date: Apr. 26, 2018) and Japanese Patent Application No. 2018-202864 (filing date: Oct. 29, 2018). All disclosures in these prior applications are incorporated herein by reference as a part of the present description.

TECHNICAL FIELD

The present invention belongs to the field of antimicrobial resins and more particularly to an additive for imparting antimicrobial properties to resins. Further, the present invention relates to an antimicrobial coating material.

BACKGROUND ART

With the recent rise in hygiene awareness, various products are required to have antimicrobial properties and, moreover, it is also required to realize them inexpensively.

For example, a resin obtained by copolymerizing a monomer comprising a quaternary ammonium salt compound, which is generally said to have antimicrobial properties, has been reported (Patent Literature 1). However, such a resin has had a problem that its production cost is high because a monomer having a quaternary ammonium group is essential for the polymerization reaction. Further, there has been a problem that a quaternary ammonium group has low thermal stability and becomes unstable during heat molding.

Furthermore, it has been reported that a polymer in which an imidazolium cation is introduced to a terminal of polybutylene terephthalate (PBT) by a polycondensation reaction has an antimicrobial property against *Staphylococcus aureus* (Non Patent Literature 1). However, the knowledge in this report is limited to the case when PBT is used, and even if broadly interpreted, it is only suggested that the knowledge can be applied to polycondensation polymers such as PBT and PET.

Moreover, it has been reported that titanium oxide having imidazolium cations bonded to the surface has antimicrobial properties (Non Patent Literature 2). However, this technique has practical concerns such as a high cost and a problem of purification. Moreover, because the presence of titanium oxide is indispensable for this technique, production of this material takes unnecessary labor.

On the other hand, Patent Literature 2 discloses cationic gel particles or a cationic string polymer prepared by using a cationic polymerization initiator. However, application of these to antimicrobial resins and antimicrobial coatings are not described.

PRIOR ART DOCUMENT

Patent Document

[Patent Document 1] JP 2003-055108 A
[Patent Document 2] WO 2017/043484

Non-Patent Document

[Non Patent Document 1] Colonna, M. et al., Reactive and Functional Polymers, vol. 72, pp 133-141 (2012)

[Non Patent Document 2] Ye, Q. et al., Journal of Materials Chemistry, vol. 22, pp 13123-13131 (2012)

SUMMARY OF THE INVENTION

The present inventors have found that a resin molded body, obtained by mixing a cationic string polymer, which has been produced by using a cationic polymerization initiator, with another resin material and molding the mixture, has excellent antimicrobial activity. Further, the present inventors have found that, by coating cationic polymer particles produced by using a cationic polymerization initiator on a surface of a solid support, the coated surface comes to have excellent antimicrobial activity. The present invention is based on these findings.

Thus, the present invention aims to provide an additive for imparting antimicrobial properties to a resin and an antimicrobial coating material.

The present invention includes the following inventions.

(1) An additive for imparting an antimicrobial property to a resin, comprising a string polymer, at least one terminal of which has a positive charge, wherein the string polymer is a polymer containing structural units derived from a cationic polymerization initiator and a monomer containing a carbon-carbon double bond.

(2) The additive according to (1), wherein the cationic polymerization initiator is a compound having a chemical structure of general formula (I):

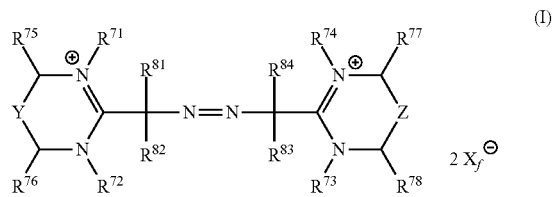

wherein,
Y represents a single bond or $CR^{85}$;
Z represents a single bond or $CR^{86}$;
$R^{72}$, $R^{73}$, $R^{75}$, $R^{76}$, $R^{77}$, $R^{78}$, $R^{85}$, and $R^{86}$ are each independently selected from the group consisting of hydrogen atom, $C_{1-6}$ alkyl, $C_{1-6}$ alkoxy, $C_{1-6}$ alkyl carbonyl, phenyl, and hydroxy, wherein the $C_{1-6}$ alkyl, $C_{1-6}$ alkoxy, $C_{1-6}$ alkyl carbonyl, and phenyl may further be substituted with one or two substituents selected from the group consisting of $C_{1-6}$ alkyl, $C_{1-6}$ alkoxy, $C_{1-6}$ alkyl carbonyl, phenyl, and hydroxy;
$R^{72}$ and $R^{73}$ may further each independently represent adamantyl or $C_{1-6}$ alkyl substituted with $Si(OCH_3)_2(CH_3)$; or $R^{75}$ and $R^{76}$, or $R^{77}$ and $R^{78}$ may together form $-(CH_2)_{3-5}-$;
$R^{81}$, $R^{82}$, $R^{83}$, and $R^{84}$ are substituents selected from the group consisting of $C_{1-4}$ alkyl, $C_{1-4}$ alkyl carbonyl, and $C_{1-3}$ alkoxy, wherein the $C_{1-4}$ alkyl may be substituted with one $C_{1-3}$ alkoxy group;
$R^{71}$ and $R^{74}$ are each independently a $C_{1-3}$ alkyl group; and
$X_f^-$ is a counter anion.

(3) The additive according to (1) or (2), wherein the cationic polymerization initiator is 2,2'-azobis-(2-(1,3-dimethyl-4,5-dihydro-1H-imidazol-3-ium-2-yl))propane triflate (ADIP).

(4) The additive according to any one of (1) to (3), wherein the monomer containing a carbon-carbon double bond is a vinyl compound monomer.

(5) The additive according to any one of (1) to (4), wherein the monomer containing a carbon-carbon double bond is one or more compounds selected from the group consisting of acrylamides, methacrylamides, acrylic acids, esters of acrylic acids, methacrylic acids, esters of methacrylic acids, styrenes, and vinyl acetate.
(6) The additive according to any one of (1) to (5), wherein the monomer containing a carbon-carbon double bond is one or more compounds selected from the group consisting of styrene and methyl methacrylate (MMA).
(7) The additive according to any one of (1) to (6), wherein the resin is a thermoplastic resin and/or a thermosetting resin.
(8) The additive according to (7), wherein the thermoplastic resin is one or more resins selected from the group consisting of olefin resins such as polystyrene, low-, medium-, and high-density polyethylene, linear low-density polyethylene, linear ultra-low-density polyethylene, isotactic polypropylene, syndiotactic polypropylene, propylene-ethylene copolymer, polybutene-1, ethylene-butene-1 copolymer, propylene-butene-1 copolymer, ethylene-propylene-butene-1 copolymer, and the like; acrylic resins such as poly(methyl methacrylate) and the like; polyester resins such as polyethylene terephthalate, polybutylene terephthalate, polyethylene naphthalate, and the like; polyamide resins such as nylon 6, nylon 6,6, nylon 6,10, and the like; and polycarbonate resin.
(9) The additive according to (7), wherein the thermosetting resin is one or more resins selected from the group consisting of phenol resins, epoxy resins, urethane resins, melamine resins, urea resins, alkyd resins, unsaturated polyester resins, and silicone resins.
(10) A method for producing an antimicrobial resin molded body, comprising steps of mixing the additive according to any one of (1) to (9) with the resin and molding the mixture.
(11) An antimicrobial resin molded body, formed by mixing the additive according to any one of (1) to (9) with the resin and molding the mixture.
(12) The antimicrobial resin molded body according to (11), which has product forms as building materials, food storage containers, medical setting supplies, kitchen supplies, toiletry supplies, stationeries, home appliances, or other everyday goods.
(13) An antimicrobial coating material comprising polymer particles with their surfaces covered with positive charges, wherein the polymer particles comprise a copolymer containing structural units derived from a cationic polymerization initiator and a monomer containing a carbon-carbon double bond.
(14) The antimicrobial coating material according to (13), wherein the polymer particles comprise a copolymer containing structural units derived from a cationic polymerization initiator, a monomer containing a carbon-carbon double bond, and a crosslinking agent.
(15) The antimicrobial coating material according to (13) or (14), wherein the cationic polymerization initiator is a compound having a chemical structure of general formula (I):

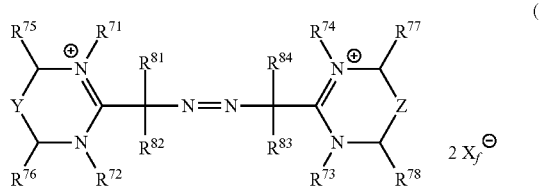

wherein,
Y represents a single bond or $CR^{85}$;
Z represents a single bond or $CR^{86}$;
$R^{72}$, $R^{73}$, $R^{75}$, $R^{76}$, $R^{77}$, $R^{78}$, $R^{85}$, and $R^{86}$ are each independently selected from the group consisting of hydrogen atom, $C_{1-6}$ alkyl, $C_{1-6}$ alkoxy, $C_{1-6}$ alkyl carbonyl, phenyl, and hydroxy, wherein the $C_{1-6}$ alkyl, $C_{1-6}$ alkoxy, $C_{1-6}$ alkyl carbonyl and phenyl may further be substituted with one or two substituents selected from the group consisting of $C_{1-6}$ alkyl, $C_{1-6}$ alkoxy, $C_{1-6}$ alkyl carbonyl, phenyl, and hydroxy;
$R^{72}$ and $R^{73}$ may further each independently represent adamantyl or $C_{1-6}$ alkyl substituted with $Si(OCH_3)_2(CH_3)$;
or $R^{75}$ and $R^{76}$, or $R^{77}$ and $R^{78}$ may together form $-(CH_2)_{3-5}-$;
$R^{81}$, $R^{82}$, $R^{83}$, and $R^{84}$ are substituents selected from the group consisting of $C_{1-4}$ alkyl, $C_{1-4}$ alkyl carbonyl, and $C_{1-3}$ alkoxy, wherein the $C_{1-4}$ alkyl may be substituted with one $C_{1-3}$ alkoxy group;
$R^{71}$ and $R^{74}$ are each independently a $C_{1-3}$ alkyl group; and
$X_f^-$ is a counter anion.
(16) The antimicrobial coating material according to any one of (13) to (15), wherein the cationic polymerization initiator is 2,2'-azobis-(2-(1,3-dimethyl-4,5-dihydro-1H-imidazol-3-ium-2-yl))propane triflate (ADIP).
(17) The antimicrobial coating material according to any one of (13) to (16), wherein the monomer containing a carbon-carbon double bond is a vinyl compound monomer.
(18) The antimicrobial coating material according to any one of (13) to (17), wherein the monomer containing a carbon-carbon double bond is one or more compounds selected from the group consisting of acrylamides, methacrylamides, acrylic acids, esters of acrylic acids, methacrylic acids, esters of methacrylic acids, styrenes, and vinyl acetate.
(19) The antimicrobial coating material according to any one of (13) to (18), wherein the monomer containing a carbon-carbon double bond is one or more compounds selected from the group consisting of styrene, styrene derivatives, and methyl methacrylate (MMA).
(20) The antimicrobial coating material according to any one of (13) to 18), wherein the monomer containing a carbon-carbon double bond is methyl methacrylate (MMA).
(21) The antimicrobial coating material according to any one of (14) to (20), wherein the cross-linking agent is N,N'-methylenebisacrylamide (MBAM) and/or divinylbenzene.
(22) The antimicrobial coating material according to any one of (13) to (21), further comprising a resin and a solvent.
(23) The antimicrobial coating material according to (22), wherein the resin is one or more resins selected from the group consisting of acrylic resins, urethane resins, silicone resins, and fluororesins.
(24) The antimicrobial coating material according to (22), wherein the solvent is one or more solvents selected from the group consisting of water, oil, thinner, and alcohol.

The present invention is advantageous in that it can provide a resin molded body or a coating material, which exhibit antimicrobial properties against various microorganisms. In addition, the present invention comprises a polymer having imidazoline, which is a water-soluble cationic functional group, bonded to its terminal and, therefore, can make positive the charge on the surface of the resin composition molded body or on the coated surface of the coating material. Therefore, the present invention is advantageous in that excellent antimicrobial properties can be imparted efficiently and inexpensively only by using a very small amount of the cationic polymer. Furthermore, the present invention is advantageous in that it can provide a stable and safe resin molded body or a coating material because the cationic polymer used in the present invention has high stability and safety.

DETAILED DESCRIPTION OF THE INVENTION

1. Additive for Imparting Antimicrobial Properties to Resins

The additive of the present invention comprises a string polymer in which at least one terminal is positively charged. This string polymer is a polymer containing a terminal structure derived from a cationic polymerization initiator and a structural unit derived from a monomer containing a carbon-carbon double bond. Further, the antimicrobial resin molded body of the present invention is one obtained by mixing the additive of the present invention with a resin material and molding the mixture by heating (in the case of a thermosetting resin) or cooling (in the case of a thermoplastic resin).

The "antimicrobial properties" in the present invention refer to the properties of suppressing generation, growth, and/or proliferation of microorganisms. Here, microorganisms refer to organisms classified as "microorganisms" according to biological taxonomy of organisms. It is a concept that includes, for example, Gram-positive bacteria such as *Staphylococcus aureus*, Gram-negative bacteria such as *Escherichia coli*, fungi, yeasts, viruses, and the like. In a preferred embodiment of the present invention, the additive of the present invention is one for suppressing generation, growth, and/or proliferation of Gram-positive bacteria such as *Staphylococcus aureus* and the like, and Gram-negative bacteria such as *Escherichia coli* and the like, that is, one for imparting antibacterial properties.

The string polymer contained in the additive of the present invention, in which at least one terminal is positively charged, is a polymer containing a terminal structure derived from a cationic polymerization initiator and a structural unit derived from a monomer containing a carbon-carbon double bond. While not adhering to any particular theory, it is thought that the above string polymer, in which at least one terminal is positively charged, shows excellent antimicrobial properties because, when the string polymer is molded by itself or mixed with other resins, positive charges become exposed on the surface of the resin molded body. Further, the cationic polymerization initiator, which brings the positive charge, is covalently bonded to the terminal of the string polymer and, therefore, the string polymer is chemically stable and is highly safe because a cationic compound, which causes irritation, does not elute. Furthermore, because addition of a very small amount of the string polymer can impart microbial properties, the antimicrobial resin molded body can be produced simply and inexpensively.

The above string polymer can be produced, for example, by preparing a polymer in which at least one terminal unit of the two terminals or a unit in the vicinity thereof has a positive charge. According to one preferred embodiment, the string polymer used in the present invention is produced by carrying out a radical polymerization reaction using a cationic polymerization initiator and a monomer containing a carbon-carbon double bond.

The cationic polymerization initiator used in the present invention is desirably one which (a) is stable to some extent without causing rapid decomposition at room temperature, (b) is water-soluble, (c) has a radical generating ability to induce a radical polymerization reaction, and (d) has a positive charge also at a terminal of a polymer after the radical polymerization reaction over a wide pH range, at least in the vicinity of neutrality.

Here, the above cationic polymerization initiator is desirably cationic on the resin surface. That is, the resin surface changes its state, such that it may be in a wet and moist environment or in a dry environment. It is desirable that the resin surface retains a positive charge under either of these conditions, in order for the effect to be exhibited for a long time. That is, even though water acts as a Bronsted's acid in water and, thus, amines and the like tend to be cationic in water, the resin surface is desired to be cationic even under an environment where water and the like are absent. Specifically, the cationic polymerization initiator preferably has, for example, a quaternary ammonium structure instead of a proton addition type cation structure.

The cationic polymerization initiator used in the present invention has a chemical structure of, for example, general formula (I):

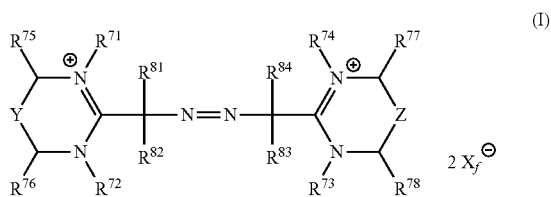

wherein,

Y represents a single bond or $CR^{85}$;

Z represents a single bond or $CR^{86}$;

$R^{72}$, $R^{73}$, $R^{75}$, $R^{76}$, $R^{77}$, $R^{78}$, $R^{85}$, and $R^{86}$ are each independently selected from the group consisting of hydrogen atom, $C_{1-6}$ alkyl, $C_{1-6}$ alkoxy, $C_{1-6}$ alkyl carbonyl, phenyl, and hydroxy, wherein the $C_{1-6}$ alkyl, $C_{1-6}$ alkoxy, $C_{1-6}$ alkyl carbonyl, and phenyl may further be substituted with one or two substituents selected from the group consisting of $C_{1-6}$ alkyl, $C_{1-6}$ alkoxy, $C_{1-6}$ alkyl carbonyl, phenyl, and hydroxy;

$R^{72}$ and $R^{73}$ may further each independently represent adamantyl or $C_{1-6}$ alkyl substituted with $Si(OCH_3)_2(CH_3)$;

or $R^{75}$ and $R^{76}$, or $R^{77}$ and $R^{78}$ may together form $-(CH_2)_{3-5}-$;

$R^{81}$, $R^{82}$, $R^{83}$, and $R^{84}$ are substituents selected from the group consisting of $C_{1-4}$ alkyl, $C_{1-4}$ alkyl carbonyl, and $C_{1-3}$ alkoxy, wherein the $C_{1-4}$ alkyl may be substituted with one $C_{1-3}$ alkoxy group;

$R^{71}$ and $R^{74}$ are each independently a $C_{1-3}$ alkyl group; and $X_f^-$ is a counter anion.

The "counter anion" in general formula (I) is not particularly limited as long as it is an anion which is usually used as a counter anion of an organic compound in the technical field of organic chemistry. The counter anion includes, for example, halide anion (chloride ion, bromide ion, fluoride ion, and iodide ion), conjugate bases of organic acids (for example, acetate ion and trifluoroacetate ion), nitrate ion, sulfate ion, carbonate ion, and the like. The preferred counter anion in the present invention includes, for example, trifluoromethanesulfonate ion (triflate), chloride ion, nitrate ion, and the like.

In addition, when the counter anion is divalent or higher, the counter anion forms ionic bonds with the corresponding number of ionic functional groups, as can be understood easily by those skilled in the art.

In one embodiment of the present invention, Y and Z in formula (I) represent a single bond.

In another embodiment, $R^{81}$, $R^{82}$, $R^{83}$, and $R^{84}$ in formula (I) are each independently selected from the group consisting of methyl, ethyl, methylcarbonyl, isobutyl, and 2-methyl-2-methoxypropyl.

In another embodiment, $R^{71}$ and $R^{74}$ in formula (I) are methyl groups.

In another embodiment, $R^{72}$, $R^{73}$, $R^{75}$, $R^{76}$, $R^{77}$, $R^{78}$, $R^{85}$, and $R^{86}$ in formula (I) are each independently selected from the group consisting of hydrogen atom, $C_{1-6}$ alkyl, $C_{1-6}$ alkoxy, $C_{1-6}$ alkylcarbonyl, phenyl, and hydroxy.

In another embodiment, $R^{75}$ and $R^{76}$, or $R^{77}$ and $R^{78}$ in formula (I) together form $-(CH_2)_4-$.

According to a preferred embodiment of the present invention, $R^{72}$ and $R^{73}$, $R^{75}$ and $R^{77}$, $R^{76}$ and $R^{78}$, $R^{81}$ and $R^{84}$, $R^{82}$ and $R^{83}$, and $R^{71}$ and $R^{74}$ in formula (I) respectively represent the same substituent, and Y and Z represent the same substituent, or both represent a single bond.

According to a further preferred embodiment of the cationic polymerization initiator used in the present invention, $R^{71}$, $R^{72}$, $R^{73}$, $R^{74}$, $R^{81}$, $R^{82}$, $R^{83}$, and $R^{84}$ in formula (I) are methyl group, $R^{75}$, $R^{76}$, $R^{77}$, and $R^{78}$ are hydrogen atoms, and Y and Z are single bonds.

The method for synthesizing the compound of formula (I) is not particularly limited, but the compound of formula (I) can be synthesized, for example, in the following manner.

First, an α,α'-azobisisobutyronitrile (AIBN) derivative:

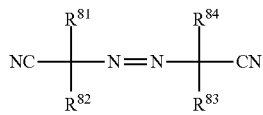

is dissolved in a suitable solvent and, in the presence of an excess amount of methanol, a hydrogen chloride gas is passed therethrough at room temperature. An active imino ester derivative can then be obtained:

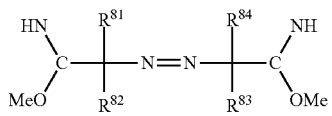

In the present description, Me in the structural formula means a methyl group. Next, to the imino ester derivative is added an excess amount of alkylenediamine derivative such as ethylenediamine and the like:

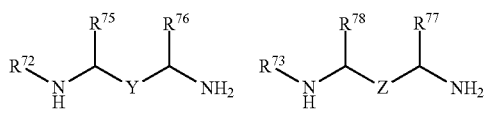

By stirring the mixture, there can be obtained a compound having a cyclic structure:

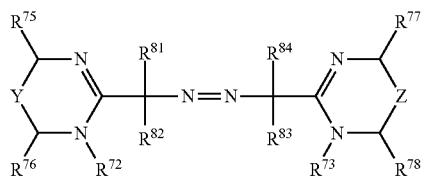

Further, by dissolving the product in dichloromethane and reacting the same with 2.1 equivalents of trifluoroethanesulfonic acid ester $R^{71}$OTf or $R^{74}$OTf at room temperature under anoxic conditions, an N-alkylation reaction occurs, and a target compound represented by formula (I) can be obtained.

According to a preferred embodiment of the present invention, the compound of above formula (I) shall be 2,2'-azobis-(2-(1,3-dimethyl-4,5-dihydro-1H-imidazol-3-ium)-2-yl))propane triflate (ADIP).

In the present invention, as a monomer that becomes a raw material for the radical polymerization reaction, any monomer can be used as long as it is a compound having a carbon-carbon double bond. Further, among them, those skilled in the art can appropriately select a suitable one from the viewpoint of efficiency, economic efficiency, safety, and the like of a radical polymerization reaction.

According to a preferred embodiment of the present invention, the monomer containing a carbon-carbon double bond, which is used in the present invention, includes vinyl compound monomers. For example, when the monomers are classified by Q values in a Q-e scheme based on the Alfrey-Price equation, which is an empirically useful index for copolymer synthesis and the like, conjugated monomers with Q≥0.2 include acrylamides, methacrylamides, acrylic acids, esters of acrylic acids, methacrylic acids, esters of methacrylic acids, styrenes, and the like, and non-conjugated monomers with Q<0.2 include vinyl acetate and the like. As it is known that monomers having close Q values have properties to copolymerize easily, copolymers within these categories can be prepared easily.

According to a particularly preferred embodiment of the present invention, the monomer containing a carbon-carbon double bond, which is used in the present invention, includes styrene, styrene derivatives, N-isopropyl acrylamide (NIPAM), N-isopropyl methacrylamide (NIPMAM), butyl acrylate, 2-ethylhexyl acrylate, ethyl acrylate, methyl acrylate, acrylic acid, methyl methacrylate (MMA), methacrylic acid, or vinyl acetate.

According to a further particularly preferred embodiment of the present invention, the monomer containing a carbon-carbon double bond, which is used in the present invention, includes styrene, styrene derivatives, or methyl methacrylate (MMA). The styrene derivatives may be any derivative that does not interfere with the polymerization reaction of the styrene moiety, and is not particularly limited. However, it may be, for example, halogenated styrene (4-halogenated styrene and the like), preferably chlorostyrene (4-chlorostyrene and the like). According to a further preferred embodiment of the present invention, the monomer containing a carbon-carbon double bond, which is used in the present invention, includes styrene or methyl methacrylate (MMA).

The string polymer used in the present invention can be synthesized based on ordinary knowledge in the technical field of polymer synthesis, and can be obtained, for example, as a polymer by radical polymerization or the like.

The amount of use of the polymerization initiator may be 0.01 mol % or more relative to the monomer used, and an appropriate amount can be selected within a range of concentration at which radical synthesis proceeds. A polymerization initiator of, for example, 0.1 mol % or more, preferably 1 mol % or more can be used.

A reaction solvent used in the polymerization reaction is not particularly limited, but as an example, there may be mentioned water, dioxane, dimethylformamide, dimethyl sulfoxide, isopropanol, and the like. The radical polymerization is not particularly limited, but can be performed at a reaction temperature of, for example, 0 to 100° C., preferably 50 to 70° C., and for a reaction time of, for example, 1 to 48 hours, preferably 2 to 16 hours.

The reaction solvent used in the polymerization reaction is not particularly limited, but there can be used, for example, water containing a surfactant (for example, sodium dodecyl sulfate, sodium dodecylbenzene sulfate, sodium pentadecane sulfate, N-dodecyl-N,N,N-trimethylammonium bromide, N-cetyl-N,N,N-trimethylammonium bromide, Triton X-100, and the like).

The polymerization reaction conditions are not particularly limited, but include, for example, a reaction temperature of 0 to 100° C., preferably 50 to 70° C., and a reaction time of, for example, 1 to 48 hours, preferably 2 to 16 hours.

In addition, based on ordinary knowledge in the technical field of polymer synthesis, it is also possible, if necessary, to cause a polymerization reaction by ultraviolet irradiation.

The string polymer used in the present invention, in which at least one terminal is positively charged, can be produced by a method described in International Publication No. WO 2017/043484.

The additive of the present invention may be added to any resin material and can be added, for example, to both thermoplastic resins and thermosetting resins.

The addition amount of the additive of the present invention may be, as a content of the string polymer relative to the total amount of the string polymer and the thermoplastic resin and/or thermosetting resin other than the string polymer, preferably 1% by mass or more, 5% by mass or more, 10% by mass or more, 20% by mass or more, 30% by mass or more, 40% by mass or more, or 45% by mass or more, or may be 100% by mass or less, 90% by mass or less, 80% by mass or less, 70% by mass or less, 60% by mass or less, or 55% by mass or less.

The thermoplastic resin which can be used in the present invention may be any conventionally known one, and there may be mentioned, for example, olefin resins such as polystyrene, low-, medium-, and high-density polyethylene, linear low-density polyethylene, linear ultra-low-density polyethylene, isotactic polypropylene, syndiotactic polypropylene, propylene-ethylene copolymer, polybutene-1, ethylene-butene-1 copolymer, propylene-butene-1 copolymer, ethylene-propylene-butene-1 copolymer, and the like; acrylic resins such as poly(methyl methacrylate) and the like; polyester resins such as polyethylene terephthalate, polybutylene terephthalate, polyethylene naphthalate, and the like; polyamide resins such as nylon 6, nylon 6,6, nylon 6,10, and the like; polycarbonate resin; and the like. In the present invention, especially, polystyrene or poly(methyl methacrylate) can be suitably used.

The thermosetting resin that can be used in the present invention may be any conventionally known one, and there may be mentioned, for example, phenol resins, epoxy resins, urethane resins, melamine resins, urea resins, alkyd resins, unsaturated polyester resins, silicone resins, and the like.

Further, in the present invention, there may be added, corresponding to the use, various compounding agents, which are publicly known per se, such as, for example, filler, plasticizers, leveling agents, thickeners, viscosity reducing agents, stabilizers, antioxidants, ultraviolet absorbers, pigments, and the like can be added according to publicly known formulation.

The antimicrobial resin molded body of the present invention can be produced according to technical common knowledge widely known to those skilled in the art by mixing the additive of the present invention and the resin, heating or cooling the mixture as necessary, and molding.

In a thermoplastic resin composition obtained by blending the above string polymer into a thermoplastic resin, an antimicrobial resin molded body, which has a shape corresponding to the use of a final molded body such as, for example, granules, pellets, fibers, films, sheets, containers, or the like, can be molded by subjecting the composition to conventionally known melt molding such as two-roll method, injection molding, extrusion molding, compression molding, and the like.

The temperature for molding into the resin molded body differs depending on the molding method and the kinds of the thermoplastic resin and the string polymer used. Therefore, even though the temperature cannot be specified categorically, it should be in a temperature range in which the thermoplastic resin used can be molded.

Further, the thermoplastic resin composition in the present invention can compose a resin molded body by itself, and can also be made into a multi-layer structure in combination with other resins.

A thermosetting resin composition obtained by blending the above string polymer with the thermosetting resin can be suitably used as a coating composition, a coating agent, an adhesive composition, or the like by a conventionally known method. In addition, the composition can also be molded into the shape of a resin molded body such as films, sheets, and the like.

The heat curing conditions for the coating film, the resin molded body, and the like are different depending on the kinds of the thermosetting resin and the string polymer used and, therefore, cannot be specified categorically. However, they can be set based on the curing temperature and curing time of the thermosetting resin used.

As a product form using the antimicrobial resin molded body, there may be mentioned building materials, food storage containers, medical setting supplies (white coat, curtain, towel, mat, wallpaper, file, door handle, and the like), kitchen supplies (chopping board, scrubber, triangle corner, dishpan, and the like), toiletry supplies (toothbrush, cup, comb, bath chair, toilet seat, and the like), stationeries (ballpoint pen, celluloid sheet, file, eraser, and the like), home appliances (refrigerator, washing machine, dryer, vacuum cleaner, telephone, electric kettle, and the like), and other everyday goods (insole of shoes, card, belt, wallet, and the like), but the product form is not limited to these.

2. Antimicrobial Coating Material

The antimicrobial coating material of the present invention comprises polymer particles whose surfaces are covered with positive charges. The polymer particles comprise a copolymer containing a structural unit derived from a cationic polymerization initiator and a structural unit derived from a monomer containing a carbon-carbon double bond.

The "antimicrobial properties" in the coating material of the present invention refer to the properties of suppressing generation, growth, and/or proliferation of microorganisms. Here, the microorganisms refer to organisms classified as "microorganisms" according to biological taxonomy of organisms. It is a concept that includes, for example, Gram-positive bacteria such as *Staphylococcus aureus* and the like, Gram-negative bacteria such as *Escherichia coli* and the like, fungi, yeasts, viruses, and the like. In a preferred embodiment of the present invention, the coating material of the present invention is one which suppresses generation, growth, and/or proliferation of Gram-positive bacteria such as *Staphylococcus aureus* and the like, and Gram-negative bacteria such as *Escherichia coli* and the like, that is, one having antibacterial properties.

The polymer particles contained in the antimicrobial coating material of the present invention are polymer particles having arbitrary shapes, whose surfaces are covered with positive charges:

The shape of the polymer particles used in the antimicrobial coating material of the present invention is preferably practically ellipsoidal, and more preferably practically spherical.

While not adhering to any particular theory, it is thought that the above polymer particles, when mixed into a coating material, shows excellent antimicrobial properties because positive charges become exposed on the surface of the coating film. Further, the above polymer particles are characterized in that they are chemically stable because they are covered with covalently bonded cationic groups on the surface and that they are highly safe because a cationic compound that causes irritation does not elute. Furthermore, because, in the antimicrobial coating material, addition of a very small amount of the string polymer can impart microbial properties, the antimicrobial coating material can be produced simply and inexpensively.

The above polymer particles can be prepared by a general synthetic method of polymer particles, such as emulsion polymerization or mini-emulsion polymerization. For example, it is possible to produce a polymer in which at least one terminal unit of the two terminals or a unit in the vicinity thereof has a positive charge. According to one preferred embodiment, the polymer particles used in the present invention are produced by carrying out a radical emulsion polymerization reaction using a cationic polymerization initiator and a monomer containing a carbon-carbon double bond.

The size of the polymer particles can be adjusted by stirring efficiency, the reaction temperature, an amount of the surfactant used, and the amount of the reaction initiator used in the polymerization reaction. For example, polymer particles having a small size can be obtained by increasing the amount of use of the surfactant and/or the reaction initiator. The size of the polymer particles obtained can be appropriately adjusted by those skilled in the art, and the particle size of the polymer of the present invention is, for example, 5 to 1000 nm.

Here, the cationic polymerization initiator and the monomer containing a carbon-carbon double bond are as described in the above 1.

The polymer particles contained in the coating material of the present invention may further use a cross-linking agent at the time of production thereof, and thus may contain a structural unit derived from the cross-linking agent.

The cross-linking agent that is used as a raw material for the radical polymerization reaction is not particularly limited as long as it is a monomer containing, depending on the situation, two or more vinyl groups in the molecule and is one usually used as a cross-linking agent. Specific examples of such a crosslinking agent include N,N'-methylenebisacrylamide, N,N'-ethylenebisacrylamide, N,N'-methylenebismethacrylamide, N,N'-ethylenebismethacrylamide, ethylene glycol diacrylate, ethylene glycol dimethacrylate, polyethylene glycol diacrylate, polyethylene glycol dimethacrylate, divinylbenzene, and the like.

The amount of the cross-linking monomer used in the present invention is not particularly limited but, depending on the situation, an amount of, for example, 0.1 to 20 mol % relative to the monomer containing a carbon-carbon double bond may be used.

According to a particularly preferred embodiment of the present invention, the cross-linking agent used in the present invention includes, depending on the situation, N,N'-methylenebisacrylamide (MBAM) or divinylbenzene.

The copolymerization reaction when using a crosslinking monomer can be performed by a method that has been conventionally used in this technical field.

According to a preferred embodiment of the present invention, the polymerization reaction is carried out under mechanical stirring. Further, in order to produce gel particles using a hydrophobic monomer, it is preferable to carry out the polymerization reaction using a solvent having high compatibility with water, for example, water, methanol, acetone, or a mixture of these. Furthermore, even in the case of producing gel particles using a water-soluble monomer, when the polymer obtained is one which is difficult to be dissolved in water, the polymerization reaction can be carried out in the same way as above by using a solvent having high compatibility with water, for example, water, methanol, acetone, or a mixture of these. Further, in the case of producing gel particles using a water-soluble monomer, when the polymer obtained is one which is dissolved easily in water, the gel particles can be produced by forming a water-in-oil emulsion using an aqueous solution of the water-soluble monomer, adding a cationic polymerization initiator thereto, and carrying out a polymerization reaction. Furthermore, when a cross-linking agent is used when producing gel particles, it is possible to form gel particles using monomers having various properties, and it is possible to improve chemical stability of the gel particles obtained.

The antimicrobial coating material of the present invention may contain other components such as a resin and a solvent in addition to the polymer particles.

The content of the polymer particles in the antimicrobial coating material of the present invention relative to the total amount of the polymer particles and the resin other than the polymer particles may preferably be 1% by mass or more, 5% by mass or more, 10% by mass or more, 20% by mass or more, 30% by mass or more, 40% by mass or more, or 45% by mass or more, or may be 100% by mass or less, 90% by mass or less, 80% by mass or less, 70% by mass or less, 60% by mass or less, or 55% by mass or less.

As the resin which can be used in the antimicrobial coating material of the present invention, all conventionally known resins can be used as long as they are ones which can form a coating film adhered to glass, plastic, wood, and metal, which are substrates. As an example, there can be mentioned acrylic resins, urethane resins, silicone resins, fluororesins, and the like. In the present invention, especially, acrylic resins such as poly(methyl methacrylate) and the like can be suitably used.

As the solvent which can be used in the antimicrobial coating material of the present invention, all conventionally known solvents can be used as long as they can disperse or dissolve the resin to be mixed. For example, there can be mentioned water, oil, thinner, alcohol, and the like. Among these, water is a solvent particularly preferred in recent years because it is less harmful to the environment and also safe for humans. In the present invention, water as a solvent can be used suitably because stability of the polymer particles in water increases due to the cationic groups on the particle surface.

Further, in the antimicrobial coating material of the present invention, there can be mixed, depending on the use thereof, pigments or various additives which are publicly known per se, according to publicly known formulations, the additives including, for example, plasticizers, dispersants, anti-settling agents, emulsifiers, thickeners, defoamers, anti-skin agents, drying agents, anti-sagging agents, matting agents, and the like.

EXAMPLES

In the following, the present invention will be described in more detail by showing examples, but the present invention is not limited to these examples.

The cationic polymerization initiator, 2,2'-azobis-(2-(1,3-dimethyl-4,5-dihydro-1H-imidazol-3-ium-2-yl))propane triflate (ADIP), which is necessary for the synthesis of the present copolymer, was synthesized according to a method described in International Publication No. WO 2017/043484 or Japanese Unexamined Patent Publication No. 2017-051113.

Example 1

Synthesis of Polystyrene Using Cationic Polymerization Initiator, 2,2'-Azobis-(2-(1,3-dimethyl-4,5-dihydro-1H-imidazol-3-ium-2-yl))propane Triflate (ADIP)

Styrene (11.5 mL, 100 mmol, purchased from Sigma-Aldrich) was placed in a reaction tube. Next, a cationic polymerization initiator, 2,2'-azobis-(2-(1,3-dimethyl-4,5-dihydro-1H-imidazol-3-ium-2-yl))propane triflate (ADIP) (0.607 g, 1 mmol), purified water (1 mL, purified by using Direct-Q UV3 from Merck) and isopropanol (12 mL) were mixed, and this mixed solution was added to the reaction tube containing styrene. This reaction tube was closed with a rubber stopper, and the reaction mixture was polymerized by stirring in an oil bath at a temperature of 40° C. for 3 hours. The reaction mixture after the polymerization reaction was reprecipitated with methanol (3 L), and the precipitated polymer was washed twice respectively with purified water and methanol. By drying the washed precipitated polymer under vacuum, powdery cationic terminal polystyrene (cation PS) was obtained. The amount obtained was 8.28 g and the yield was 75%. In addition, when the molecular weight was measured by gel filtration chromatography, the weight average molecular weight was about 13,000.

Example 2

Production of Polystyrene Film Using Cationic Terminal Polystyrene (Cation PS)

Commercially available polystyrene (polystyrene, serial number 430102, weight average molecular weight=about 192,000, purchased from Sigma-Aldrich) was used as a mixing material to verify the effect of the cationic terminal polystyrene (cation PS). The cationic terminal polystyrene (cation PS) and the above-mentioned commercial product of polystyrene were mixed at predetermined weight ratios (5:5, 3:7, or 0:10, that is, the content of the cationic terminal polystyrene (cation PS) is 50% by mass, 30% by mass, or 0% by mass, respectively), and to these mixtures was added tetrahydrofuran (6 mL), and the mixtures obtained were stirred at 50° C. and 300 rpm for about 2 hours. After completion of stirring, these mixtures were poured onto polytetrafluoroethylene (PTFE) Petri dishes and dried at room temperature for about 12 hours. After drying, the films obtained were crushed, dried under vacuum at 180° C. for 2 hours, and a residual solvent was removed to obtain pellets. The pellets obtained were melted at a temperature of 180° C. for 10 minutes, and the molten materials obtained were hot press molded at 4 MPa for 10 minutes to obtain polystyrene films having a thickness of 0.1 to 0.2 mm.

Further, for antibacterial testing, a film composed of only cation PS (the content of cation PS is 100% by mass) was prepared by the following method. First, cation PS was repeatedly hot press molded at 140° C. to remove air bubbles inside the film. Furthermore, by using a silicone rubber sheet (thickness 0.5 mm), the inside of which was cut out so that the inside becomes a square of 50 mm sides, cation PS was hot press molded (140° C., 4 MPa) to obtain a film having a cation PS content of 100% by mass with a size of 50 mm×50 mm×0.5 mm.

Surface zeta potentials of the polystyrene films obtained were measured by the following method. First, monitor particles were added to an aqueous sodium chloride solution (10 mM) to prepare an aqueous sodium chloride solution containing monitor particles. Next, the polystyrene film was inserted into a flat plate cell which is an accessory to a zeta electrometer (Otsuka Electronics, ELSZ-2000ZEH), the inside of the cell was filled with the aqueous sodium chloride solution containing monitor particles, and the zeta potential of the polystyrene film was measured at 25° C. by using the zeta electrometer.

Table 1 shows average values of zeta potentials obtained by measuring each sample three times. Polystyrene has an aromatic ring at the side chain and, therefore, its surface potential usually shows a negative value. However, when a general heat molding treatment was performed after adding a cationic terminal polystyrene (cation PS) to polystyrene and mixing the two, there was obtained a polystyrene film in which the surface zeta potential had changed from negative to positive.

[Table 1]

TABLE 1

Effect of content of cation PS on surface zeta potential of polystyrene film

| | Content of cation PS (% by mass) | | | |
|---|---|---|---|---|
| | 0 | 30 | 50 | 100 |
| Surface zeta potential (mV) | −23.3 | 2.0 | 7.0 | −1.4 |

According to Table 1, polystyrene films having a content of cationic terminal polystyrene (cation PS) of 30% by mass and 50% by mass have higher degrees of change to positive in the zeta potential than the polystyrene film having a content of cationic terminal polystyrene (cation PS) of 100% by mass. From this result, it has become clear that a polystyrene film having a cationic surface can be efficiently produced by the addition of a relatively small amount of cationic terminal polystyrene (cation PS).

Example 3-1

Antimicrobial Test of Polystyrene Film Synthesized by ADIP The antimicrobial test of the polystyrene films was carried out according to JIS Z 2801:2000 "Antibacterial products-Test for antibacterial activity and efficacy." As the bacterial species tested in the antimicrobial test, there were used *Staphylococcus aureus* subsp. *aureus* NBRC 12732 and *Escherichia coli* NBRC 3972. As the polystyrene films tested, there were used a polystyrene film in which a content of the cationic terminal polystyrene (cation PS) is 50% by mass and a polystyrene film in which a content of the cationic terminal polystyrene (cation PS) is 0% by mass, both having been prepared in Example 2. Further, a commercially available polyethylene film was tested as a comparative control. These polystyrene films or polyethylene film were cut into a size of 5 cm square and each was subjected to the antimicrobial test.

The results of the antimicrobial test are shown in Table 2. Antibacterial activity values calculated from the results shown in Table 2 according to the following Math. 1 are shown in Table 3.

[Math. 1]

Antibacterial activity value=[average of logarithmic values of the number of live bacteria/cm$^2$ after 24 hours on polyethylene film or hydrophilized polyethylene naphthalate film]-[average of logarithmic values of the number of live bacteria/cm$^2$ after 24 hours on polystyrene film]  (1)

TABLE 3

Antibacterial activity values of polystyrene film for bacteria

| Test bacteria | Polystyrene film*[1] | Antibacterial activity value |
| --- | --- | --- |
| *Staphylococcus aureus* subsp. *aureus* NBRC 12732 | PSF(0) | 1.2 |
| | PSF(50) | 2.9 |
| *Escherichia coli* NBRC 3972 | PSF(0) | 1.9 |
| | PSF(50) | 2.6 |

*[1]Name of each polystyrene film: PSF, polystyrene film (the figure in parenthesis shows the content (%) of cationic terminal polystyrene (cation PS)).

According to Table 3, the film which showed an antibacterial activity value exceeding 2.0 for both *Staphylococcus aureus* subsp. *aureus* NBRC 12732 and *Escherichia coli* NBRC 3972 was the polystyrene film containing 50% by mass of the cationic terminal polystyrene (cation PS) and, in particular, high antimicrobial activity was observed with *Staphylococcus aureus* subsp. *aureus* NBRC 12732.

Apart from the above test, when PSF (100) was also subjected to an antibacterial test against *Staphylococcus aureus* subsp. *aureus* NBRC 12732 according to JIS Z 2801:2000 "Antibacterial products-Test for antibacterial activity and efficacy," the antibacterial activity value was 2.5 in comparison with hydrophilized polyethylene naphthalate and, thus, it has become clear that PSF (100) has high antimicrobial activity.

Example 3-2

Antimicrobial Test of Polystyrene Film Synthesized with Other Amine-Based Polymerization Initiator (1) Synthesis of Polystyrene (OG797) Using VA-061 (2,2'-azobis[2-(2-imidazolin-2-yl)propane], CAS RN:20858-12-2) as Initiator In a 30 mL vial, there were placed styrene (14.1 mL, 122.7 mmol), isopropanol (14.7 mL, had been substituted with nitrogen), and a stirring bar and mixed. Next, VA-061 (306.4

TABLE 2

Results of the test for antimicrobial properties of polystyrene film

| Test bacteria | Measurement | Test piece*[1] | Number of live bacteria/cm$^2$ test piece | | |
| --- | --- | --- | --- | --- | --- |
| | | | Measurement-1 | Measurement-2 | Measurement-3 |
| *Staphylococcus aureus* subsp. *aureus* NBRC 12732 | immediately after seeding | PEF | 9.3 × 10$^3$ | 1.1 × 10$^4$ | 9.3 × 10$^3$ |
| | after 24 h at 35° C. | PSF(0) | 1.1 × 10$^2$ | 4.1 × 10$^2$ | 7.6 × 10$^2$ |
| | | PEF | 5.1 × 10$^3$ | 5.9 × 10$^3$ | 6.3 × 10$^3$ |
| | immediately after seeding | PEF | 1.6 × 10$^4$ | 1.9 × 10$^4$ | 1.6 × 10$^4$ |
| | after 24 h at 35° C. | PSF(50) | <0.63*[2] | 71 | 7.5 × 10$^2$ |
| | | PEF | 3.2 × 10$^4$ | 2.4 × 10$^4$ | 2.8 × 10$^4$ |
| *Escherichia coli* NBRC 3972 | immediately after seeding | PEF | 1.4 × 10$^4$ | 1.4 × 10$^4$ | 1.4 × 10$^4$ |
| | after 24 h at 35° C. | PSF(0) | 3.4 × 10$^3$ | 6.0 × 10$^3$ | 9.4 × 10$^3$ |
| | | PSF(50) | 1.2 × 10$^3$ | 1.3 × 10$^3$ | 1.4 × 10$^3$ |
| | | PEF | 4.5 × 10$^5$ | 5.8 × 10$^5$ | 5.9 × 10$^5$ |

*[1]Name of each test piece: PEF, polyethylene film; PSF, polystyrene film (the figure in parenthesis shows the content (%) of cationic terminal polystyrene (cation PS)).
*[2]Could not be detected.

According to Table 2, it has become clear that the polystyrene films have bacteriostatic effects against *Escherichia coli* NBRC 3972 and have high bactericidal activity against *Staphylococcus aureus* subsp. *aureus* NBRC 12732.

mg, 1.22 mmol) was weighed, dissolved in purified water (1 mL, had been substituted with nitrogen), and the solution was charged into the vial. The cap of the vial was closed, and the styrene was polymerized to form PS by stirring for 3 hours under heating at a temperature of 70° C. The vial was left to stand in a hood and, thereafter, the polymer layer that had settled in the lower layer was recovered with a Pasteur pipette. The polymer was reprecipitated with 1 L hexane and left to stand overnight. Thereafter, hexane was removed by decantation, 1 L of methanol was added, and the polymer was washed for 3 hours. Finally, all the precipitates were dissolved with chloroform and the solvent was evaporated to dryness under reduced pressure to obtain white powder.

(2) Synthesis of Polystyrene (TT099) Using V-50 (2,2'-azobis(2-methylpropionamidine) dihydrochloride, CAS: 2997-92-4) as Initiator All purified water was used after purging dissolved oxygen for 30 minutes or longer by nitrogen bubbling while stirring with a stirrer. A 1 L separable baffled flask was equipped with a reflux condenser, and synthesis was performed by using Sealing Mixer UZU (Nakamura Kagaku Kikai Kogyo Co., Ltd.) and a stainless-steel blade. Therein was placed 400 mL of purified water and the mixture was heated to 70° C. with a mantle heater. Further, 100 mL of ethanol (20% (v/v)) was charged, and styrene (11.5 mL, 200 mM), which had been treated with Inhibitor remover (Sigma-Aldrich), and 2 mM (271 mg) of V-50 were added, and the mixture was subjected to emulsion polymerization under a nitrogen atmosphere for 7 hours under stirring at 450 rpm with the temperature raised and controlled at 70° C. as measured by a thermometer inserted into the reaction liquid. The reaction mixture of 370 mL was recovered and centrifuged at 40,000×g for 2 hours, and the precipitate was recovered and washed with 20 mL of methanol. The precipitate was centrifuged again at 40,000×g for 2 hours, dissolved in 10 mL of chloroform, reprecipitated with 1 L of hexane, and allowed to stand overnight. Thereafter, hexane was removed by decantation, 1 L of methanol was charged, and the precipitate was washed for 3 hours. The precipitate was collected by filtration with a glass filter and dried under reduced pressure to obtain white powder.

(3) Synthesis of Polystyrene (OG691) Using Cationic Polymerization Initiator 2,2'-azobis-(2-(1,3-dimethyl-4,5-dihydro-1H-imidazol-3-ium-2-yl))propane triflate (ADIP)

Polystyrene was synthesized in the same manner as in Example 1. Styrene (11.5 mL, 100 mmol), isopropanol (12 mL), and a stir bar were placed in a vial and mixed. Next, ADIP (0.61 g, 1 mmol) was weighed, dissolved in purified water (1 mL), and charged into the vial. The cap was closed, and polymerization was performed by heating and stirring the mixture at a temperature of 40° C. for 3 hours. The reaction was stopped by opening the cap, and the polymerization reaction liquid was reprecipitated with 1 L of hexane. After precipitation was confirmed, hexane was removed, 1 L of methanol was added, and the mixture was left to stand overnight. Finally, the precipitate was washed with a small amount of hexane and dried under vacuum to obtain white powder.

(4) Film Formation of Polystyrene Powder Synthesized

For the antibacterial test, the PS powder synthesized in (1) to (3) above was each formed into a film by the following method. The powder sample was sandwiched between SUS plates (release material: PET sheet) and placed on a temperature-controlled hot press. The sample was melted for 10 minutes and, thereafter, pressure-molded for 10 minutes. The molding temperature was 140° C. for OG691, 140° C. for OG797, and 160° C. for TT099. Further, the pressure was adjusted between 2 MPa and 6 MPa depending on the sample. After the pressure molding, the temperature was lowered to the glass transition temperature or lower, and the film prepared was peeled off from the release material.

(5) Antimicrobial Test of Film

The antimicrobial test of the polystyrene films was carried out according to JIS Z 2801:2000 "Antibacterial products-Test for antibacterial activity and efficacy." As the bacterial species tested in the antimicrobial test, there was used *Staphylococcus aureus* subsp. *aureus* NBRC 12732. As a comparative control, a commercially available polyethylene film was tested. These polystyrene films or polyethylene film were cut into a predetermined size and each was subjected to the antimicrobial test.

With regard to the polystyrenes synthesized, the yields, molecular weights measured by gel filtration chromatography (number average molecular weight, Mn, and weight average molecular weight, Mw), and antibacterial activity values, calculated from the number of bacteria measured in the antimicrobial test according to Math. 1 are shown in Table 4. As can be seen from this table, no antibacterial activity was observed in polystyrenes synthesized with V-50 and VA-061 which are amine-based polymerization initiators, and it has become clear that strong antibacterial activity is exhibited only by polystyrene synthesized with ADIP having an imidazolium cation in its structure.

TABLE 4

Antibacterial activity of film-formed PS synthesized with amine-based cationic polymerization initiators

| Sample | Initiator | Yield (%) | Mn | Mw | Mw/Mn | Antibacterial activity value |
|---|---|---|---|---|---|---|
| OG691 | ADIP | 42 | 13,000 | 59,000 | 4.6 | >4.7 |
| OG797 | VA-061 | 37 | 2,100 | 8,100 | 3.9 | 0 |
| TT099 | V-50 | 13 | 6,600 | 96,000 | 14.5 | 0.2 |

Example 3-3

Antimicrobial Test of Polystyrene (PS)/Poly(methyl methacrylate) (PMMA) Copolymer Film A PMMA-co-PS random copolymer (OG811) was synthesized according to the following procedure. In a 30 mL vial, there were placed styrene (7.1 mL, 61.4 mmol), methyl methacrylate (6.1 mL, 61.4 mmol), isopropanol (14.7 mL, had been bubbled with nitrogen) and a stir bar were placed in a vial and mixed. Next, ADIP (746.1 mg, 1.22 mmol) was weighed, dissolved in purified water (1 mL, had been bubbled with nitrogen), and charged into the vial. The cap of the vial was closed, and PMMA-co-PS was polymerized by stirring for 3 hours under heating at 50° C. After the polymerization was completed, the copolymer was reprecipitated with 1 L of hexane and left to stand overnight. Thereafter, hexane was removed by decantation, 1 L of methanol was charged, and the precipitate was washed for 3 hours. After filtration with a glass filter, the mixture was dried under reduced pressure to obtain white powder (yield 17%).

Further, a film was prepared by pressure heat molding by the same method as in Example 3-2, and the antibacterial activity was measured similarly according to the method of antimicrobial test described in Example 3-2.

With regard to the PMMA-co-PS (OG811) synthesized, the molar ratio of PMMA and PS calculated from the NMR, molecular weight (number average molecular weight, Mn, and weight average molecular weight, Mw) measured by gel filtration chromatography, and antibacterial activity value, calculated according to Math. 1 from the number of bacteria measured in the antimicrobial test, are shown in Table 5. As can be seen from this table, strong antibacterial activity was also observed in PS containing PMMA in an amount of about 40%, and it has been shown that the antibacterial activity is exhibited not only when using polystyrene but also when using another polymer.

TABLE 5

| Sample | Polymer molar ratio | Mn | Mw | Mw/Mn | Antibacterial activity value |
|---|---|---|---|---|---|
| OG811 | PS/PMMA = 60/40 | 5,800 | 14,000 | 2.4 | >4.6 |

Example 4

Safety Test of Polystyrene Film (Human-Derived Cell Proliferation Test)

As the polystyrene film tested, there were used the polystyrene films prepared in Example 2 having a cationic terminal polystyrene (cation PS) content of 50% by mass and a cationic terminal polystyrene (cation PS) content of 0% by mass. Further, as a comparative control, there was used a commercially available polystyrene Petri dish for cell culture (Falcon, product number 353003), which is usually used in culturing cells. These polystyrene films or polystyrene Petri dishes were cut into a size of 2 cm square, and each piece was subjected to a safety test. Each piece of the films or the Petri dish was wiped with a 70% aqueous ethanol solution, dried, and placed in a film bottom dish (ibidi). HeLa cells (derived from human cervical cancer) were cultured in DMEM (10% FBS, 1% P/S), and the HeLa cells were seeded at $4 \times 10^4$ cells/piece (medium amount: 400 μL). These cell seeding concentrations were set to be approximately 1/10 of the confluent cell concentration. After culturing at 37° C. (5% $CO_2$, 100% humidity) and washing with HBSS after 48 hours, the cells were stripped with 1 mL of 0.25% trypsin-EDTA and, after adding 0.5 mL of the medium, stained with trypan blue, and thereafter the number of cells was measured under a microscope.

The results of the number of cells after placing each film in the culture medium and culturing the HeLa cells for 48 hours are shown in Table 6.

TABLE 6

Results of the test for proliferation of human-derived cells, performed by placing polystyrene films or polystyrene Petri dish in culture

| Sample[1)] | Number of cells seeded | Number of cells recovered | Survival rate of recovered cells (%) |
|---|---|---|---|
| PSF(50) | $4 \times 10^4$ | $25 \times 10^4$ | 100 |
| PSF(0) | $4 \times 10^4$ | $12 \times 10^4$ | 100 |
| PSS | $4 \times 10^4$ | $21 \times 10^4$ | 98 |

[*1)]Name of each sample: PSF, polystyrene film (the figure in parenthesis shows the content (%) of cationic terminal polystyrene (cation PS)); PSS, polystyrene Petri dish.

As can be seen from Table 6, the polystyrene film having a content of cationic terminal polystyrene (cation PS) of 50% by mass showed better proliferation than the polystyrene film having a content of cationic terminal polystyrene (cation PS) of 0% by mass. With the polystyrene film having a content of cationic terminal polystyrene (cation PS) of 50% by mass, the proliferation corresponds to cell division of approximately once every 18 hours, meaning that the cells are increasing at a general proliferation rate. In fact, it can also be seen from Table 6 that, on the polystyrene film having a content of cationic terminal polystyrene (cation PS) of 50% by mass, the HeLa cells were proliferating at a growth rate almost equal to or higher than that of the commercially available polystyrene Petri dish. Although the polystyrene film containing 50% by mass of the cationic terminal polystyrene (cation PS) showed a bacteriostatic or bactericidal effect on *Escherichia coli* NBRC 3972 and *Staphylococcus aureus* subsp. *aureus* NBRC 12732, it did not affect proliferation of human-derived cells and, thus, showed high safety.

Example 5

Antimicrobial Test Using Cationic Poly(methyl methacrylate) (PMMA) Particle-Coated Glass (1) Synthesis of Cationic poly(methyl methacrylate) (PMMA) Particles OG157

In a 30 mL transparent vial, there was placed 28 mL of nitrogen-purged purified water. To 1 mL of purified water, 0.48 mg (0.05 mM) of hexadecyltrimethylammonium chloride (CTAC) was added, the mixture was heated to dissolve the chloride, and the solution was subsequently added to the above 30 mL transparent vial, which was set in a 60° C. hot water bath and the content was stirred using a stir bar. Next, 192.23 mg (64 mM) of methyl methacrylate was added thereto, and the vial was returned to the hot water bath to emulsify the content for 30 minutes. The vial was taken out, and 37.31 mg (2.05 mM) of 2,2'-azobis-(2-(1,3-dimethyl-4,5-dihydro-1H-imidazol-3-ium-2-yl))propane triflate (ADIP) dissolved in 1 mL of purified water was added dropwise thereto, and the vial was returned to the hot water bath to start a reaction. After a reaction at 60° C. for 6 hours under stirring with a stir bar, the vial was taken out and dialysis purification (molecular weight cutoff (MWCO): 6-8 kDa) was performed for 5 days (substituted about 3 times a day) to obtain a test sample (OG157). The yield was 47%. Other physical properties are shown in Table 5. In addition, $d_{DLS}$ in Table 5 refers to a particle diameter (Z-Ave) according to a dynamic light scattering method, measured by Zetasizer Nano ZSP (Malvern). Further, PdI represents a polydispersity index and can evaluate the width of the particle diameter distribution. A distribution with a PdI value of 0.1 or less is commonly referred to as being monodisperse. On the other hand, a dispersion having a value between 0.1 and 0.3 is considered to have a narrow size distribution. The zeta potential was measured by Zetasizer Nano ZSP (Malvern).

(2) Synthesis of Anionic poly(methyl methacrylate) (PMMA) Particles OG156

In a 30 mL transparent vial, 28 mL of nitrogen-purged purified water was placed, 192.23 mg (64 mM) of methyl methacrylate was added thereto, and the vial was set in a hot water bath and the content was stirred by using a stir bar. The above vial was taken out, ammonium persulfate (2.05 mM)

dissolved in 1 mL purified water was added dropwise, and the vial was returned to the hot water bath to start the reaction. After a reaction at 70° C. for 6 hours while stirring with a stir bar, the vial was taken out and the content was subjected to dialysis purification (molecular weight cutoff (MWCO): 6-8 kDa) for 5 days (substituted about 3 times a day) to obtain a test sample (OG156). The yield was 61%. Other physical properties are shown in Table 7.

TABLE 7

Physical properties of samples

| Sample | Charge | dDLS (nm) | PdI | Concentration (mg/mL) | Zeta potential (mV) |
|---|---|---|---|---|---|
| OG156 | anion | 135.4 | 0.03 | 4.18 | −26.8 ± 0.7 |
| OG157 | cation | 301.4 | 0.22 | 3.28 | 21.4 ± 1.2 |

(3) Preparation of Coated Glass

Each 4 mL of suspensions of the samples OG156 and OG157 was applied on a glass plate having a size of 5×5 cm and a thickness of 3 mm and, after natural drying, the sample was heat fused on a hot plate at 140° C. for 1 hour to prepare a glass plate coated with particles of each suspension.

(4) Antimicrobial Test of Each Coated Glass

The antimicrobial test method was in accordance with JIS Z 2801:2000, "Antibacterial products-Test for antibacterial activity and efficacy." As the bacterial species, there were used *Staphylococcus aureus* subsp. *aureus* NBRC 12732. Glass plates coated with the samples OG156 and OG157, respectively, and a polyethylene film as a comparative control were prepared, and three samples were each evaluated for antibacterial activity.

Table 8 shows antibacterial activity values calculated from the antimicrobial test results of each coated glass plate according to the Math. 1 in Example 3.

TABLE 8

Antibacterial activity values of poly(methyl methacrylates) particles

| Sample | Antibacterial activity value (as compared with polyethylene film) |
|---|---|
| Anionic PMMA-coated glass plate | 2.1 |
| Cationic PMMA-coated glass plate | 4.7 |

According to Table 8, the glass surface coated with the cationic poly(methyl methacrylate) (PMMA) particles had a remarkably high antibacterial activity value as compared with the glass surface coated with the anionic poly(methyl methacrylate) (PMMA) particles. In addition, the antibacterial activity value of the cationic poly(methyl methacrylate) (PMMA)-coated glass plate was 2.6 when the anionic poly(methyl methacrylate) (PMMA)-coated glass plate was used as a comparative control. Generally, when the antibacterial value exceeds 2.0, the corresponding material is considered to have antimicrobial activity. Therefore, it has become clear that the cationic poly(methyl methacrylate) (PMMA) particles have antimicrobial activity as compared with the anionic poly(methyl methacrylate) (PMMA) particles synthesized by a conventional method. It has become clear that application of the cationic poly(methyl methacrylate) (PMMA) particles can impart antimicrobial properties to surfaces of materials other than the polymer material.

Example 6-1

Antimicrobial Test Using Cationic Polystyrene (PS) Particle-Coated Glass (1) Synthesis of Cationic Polystyrene (PS) Particles AK057

As a reaction vessel, a separable baffled 1 L flat bottom flask was used. A stirring blade (AS ONE, product number 1-7732-04) with a rotating blade diameter of 040 mm was set on a mechanical stirrer and the separable flask was assembled, 404 mL of water was added therein, and the liquid temperature was controlled to become 60° C. with a mantle heater. While stirring water at a speed of 450 rpm, nitrogen bubbling was performed for 30 minutes or longer. Thereafter, 45 mL of ethanol and, at the same time, 3.0 g (64 mM) of styrene were added, subsequently 559.5 mg (2.05 mM) of ADIP dissolved in 2 mL of ultrapure water was added dropwise, the flask was closed tightly, and the reaction was started. After a lapse of 16 hours, the reaction was stopped. The reaction solution obtained was subjected to removal of unreacted styrene monomer and concentration using an evaporator and, thereafter, dialyzed with a 7.5 kDa dialysis membrane for 1 day (water of the external liquid was exchanged 3 times) to complete purification. This cationic PS particle was designated as AK057. AK057 had a particle diameter of 180 nm, PdI, which represents dispersibility, of 0.021, and a zeta potential of 28 mV.

(2) Preparation of Coated Glass

In a 1.0% (w/v) aqueous sodium hydroxide solution, a glass plate with a size of 5×5 cm and a thickness of 3 mm was immersed for 30 minutes or longer to be hydrophilized, and a suspension of AK057 corresponding to a polymer content of 0.7 mg was placed on the glass plate so that its whole surface was coated. The glass plate, which was dried naturally and, thereafter, subjected to dry heat sterilization at 140° C. for 1 hour with the PS particles melted, was used as a sample.

(3) Antimicrobial Test of Coated Glass

The antimicrobial test method was in accordance with JIS Z 2801:2010, "Antibacterial products-Test for antibacterial activity and efficacy." As the bacterial species, there were used *Staphylococcus aureus* subsp. *aureus* NBRC 12732 and *Escherichia coli* NBRC 3972. The antibacterial activity of the glass plate coated with AK057 was evaluated. As a comparative control, uncoated glass plate was also evaluated for antibacterial activity in the same manner.

Further, antibacterial activity regarding *Staphylococcus aureus* IID 1677, MRSA; *Enterococcus faecium* NCTC 12204, VRE; *Staphylococcus epidermidis* NBRC 12993; and *Listeria monocytogenes* VTU 206 was also evaluated in the same manner based on JIS Z 2801:2010, "Antibacterial products-Test for antibacterial activity and efficacy" by changing the bacteria to be seeded to these bacteria. In addition, a 1/100 NB medium was used as a bacterial liquid preparation solution for VRE, and a 1/200 NB medium was used as a bacterial liquid preparation solution for MRSA and *Staphylococcus epidermidis* NBRC 12993.

The antibacterial activity values showing the antimicrobial test results of the glass plates coated with the cationic PS were calculated according to the following Math. 2 and are shown in Table 9.

[Math. 2]

Antibacterial activity value=[average of logarithmic values of the number of live bacteria/cm$^2$ after 24 hours on uncoated glass plate]-[average of logarithmic values of the number of live bacteria/cm$^2$ after 24 hours on cationic PS-coated glass plate] (2)

TABLE 9

Antibacterial activity values of glass plates coated with cationic PS particles

| Bacterial species | Antibacterial activity value (as compared with uncoated glass plate) |
|---|---|
| Staphylococcus aureus subsp. aureus NBRC 12732 | >4.4 |
| MRSA | >4.6 |
| VRE | >4.6 |
| Staphylococcus epidermidis NBRC 12993 | >4.0 |
| Listeria monocytogenes VTU 206 | >5.1 |
| Escherichia coli NBRC 3972 | 4.7 |

As shown in Table 9, it has become clear that the glass surfaces coated with the cationic PS particles have remarkably high antibacterial activity values as compared with the uncoated glass plate. The antibacterial activity value was 4 or more for all of the bacterial species and it can be seen that the number of bacteria could be reduced to ¹⁄₁₀,₀₀₀ or less. Further, it has become clear that the glass surface coated with cationic PS particles also has high antimicrobial activity against all of *Staphylococcus aureus* subsp. *aureus* NBRC 12732 and *Listeria monocytogenes* which are Gram-positive bacteria, and *Escherichia coli* NBRC 3972 which is Gram-negative bacteria.

Example 6-2

Antimicrobial Test Using Other Cationic Polystyrene (PS) Particle-Coated Glass
(1) Synthesis of PS Particles (AK069') Using Cationic Polymerization Initiator ADIP As a reaction vessel, a separable baffled 1 L flat bottom flask was used. A stirring blade (AS ONE, product number 1-7732-04) with a rotating blade diameter of 040 mm was set on a mechanical stirrer and the separable flask was assembled, 404 mL of water was added therein, and the liquid temperature was controlled to become 60° C. with a mantle heater. While stirring water at a speed of 450 rpm, nitrogen bubbling was performed for 30 minutes or longer. Thereafter, 45 mL of ethanol and, at the same time, 3.0 g (64 mM) of styrene were added, subsequently 559.5 mg (2.05 mM) of ADIP dissolved in 2 mL of ultrapure water was added dropwise, the flask was closed tightly, and the reaction was started. After a lapse of 16 hours, the reaction was stopped. The reaction solution obtained was subjected to removal of unreacted styrene monomer and concentration using an evaporator, and then dialyzed with a dialysis membrane with MWCO of 7.5 kDa for 1 day (water of the external liquid was exchanged 3 times) to complete purification. This cationic PS particle was designated as AK069. AK069 had a particle diameter of 146 nm, PdI, which represents dispersibility, of 0.05, and a zeta potential of 24.9 mV, and its yield was 1.8%.

(2) Synthesis of PS Particles (AK108) Using Cationic Polymerization Initiator ADIP Ultrapure water had been nitrogen-purged for 30 minutes or longer beforehand. To a vial, there were added 27 mL of ultrapure water, 9% (v/v) ethanol, 16 mM of styrene, and 2.05 mM of an aqueous ADIP solution. The reaction was carried out at 70° C. for 3 hours while stirring with a multi-stirrer (Iuchi Seieido Co., product number MSR-12). After evaporating ethanol in a hood, dialysis was performed for 1 day (water exchange: 3 times) with a dialysis membrane with MWCO of 7.5 kDa. AK 108 had a particle diameter of 211 nm, PdI, which represents dispersibility, of 0.002, and a zeta potential of 38.0 mV, and its yield was 65%.

(3) Preparation of PS Particle-Coated Glass

In a 1.0% (w/v) aqueous sodium hydroxide solution, a glass plate with a size of 5×5 cm and a thickness of 3 mm was immersed for 30 minutes or longer to be hydrophilized, and thereafter a polystyrene particle suspension of a coating amount (nmol) shown in the following Table 10 was placed on the glass plate so that its whole surface was coated. The coating amount (nmol) was calculated by dividing the weight of the polymer coated by the weight average molecular weight obtained from gel filtration chromatography. The glass plate, which was dried naturally and, thereafter, subjected to dry heat sterilization at 140° C. for 1 hour with the PS particles melted, was used as a sample.

(4) Antimicrobial Test of Coated Glass

The antimicrobial test method was in accordance with JIS Z 2801:2010, "Antibacterial products-Test for antibacterial activity and efficacy." As the bacterial species, there was used *Staphylococcus aureus* subsp. *aureus* NBRC 12732. Physical properties of polystyrene particles, which were synthesized by the above-mentioned method and showed antibacterial activity in the antimicrobial test, are shown in Table 10. The average particle diameter (dDLS), PdI, and an average zeta potential were measured by Zetasizer Nano ZSP (Malvern). The antibacterial activity of the glass plates coated with these polystyrene particle samples was evaluated. As a comparative control, uncoated glass plate was also evaluated for antibacterial activity in the same manner.

Antibacterial activity against *Staphylococcus aureus* subsp. *aureus* NBRC 12732 is shown in Table 10.

TABLE 10

Physical properties and coating conditions of polystyrene particle samples subjected to antimicrobial tests, the polystyrene particles synthesized using ADIP as initiator

| Sample | Coating amount (nmol) | Weight average molecular weight, Mw | Antibacterial activity value | dDLS (nm) | PdI | Average zeta potential (mV) |
|---|---|---|---|---|---|---|
| AK069 | 68 | 8,800 | 2.7 | 146 | 0.05 | 24.9 |
| AK108 | 45 | 170,000 | 2.2 | 212 | 0.002 | 38.0 |

It is determined by the test method that uncoated glass has an antibacterial activity value of 0 and a sample with an antibacterial activity value of 2 or more has antibacterial activity. With regard to the antibacterial properties of the PS particles obtained by using ADIP as an initiator, the antibacterial activity could be confirmed even with a relatively short polymer having a weight average molecular weight (Mw) of about 8,800 (AK069), and the antibacterial activity was confirmed even with polymer particles having a relatively high molecular weight of about 170,000 (AK108).

Thus, it has become clear that the antibacterial property is not affected by the molecular weight.

Example 6-3

Antimicrobial Test of Glass Coated with Polystyrene (PS) Particles Having Weight Average Molecular Weight of about 10,000, Synthesized by Using Other Amine-Based Polymerization Initiators Polystyrene particles were synthesized with amine-based initiators, 2,2'-azobis(2-methylpropionamidine)dihydrochloride (V-50) (CAS No. 2997-92-4) and 2,2'-azobis[2-(2-imidazolin-2-yl)propane]dihydrochloride (VA-044) (CAS No. 27776-21-2), and a cationic polymerization initiator 2,2'-azobis-(2-(1,3-dimethyl-4,5-dihydro-1H-imidazol-3-ium-2-yl))propane triflate (ADIP), which are commercially available. Glass plates coated with those polystyrene particles were subjected to antimicrobial activity tests and comparison of their antibacterial activity was carried out.

(1) Synthesis of PS Particles (AK057) Using a Cationic Polymerization

Initiator ADIP For a synthetic method, see Example 6-1(1). The weight average molecular weight of the polymer by gel filtration chromatography was 8,800.

(2) Synthesis of PS Particles (AK145-2) Using Amine-Based Polymerization Initiator V-50

Ultrapure water had been nitrogen-purged for 30 minutes or longer beforehand. To a vial, there were added 18 mL of ultrapure water, 40% (v/v) acetone, 280 mM of styrene, and 3.63 mM of a V-50 aqueous solution. The reaction was carried out at 70° C. for 3 hours while stirring with a multi-stirrer (Iuchi Seieido Co., product number MSR-12). After evaporating acetone in a hood, dialysis was performed for 1 day (water exchange: 3 times) with a dialysis membrane with MWCO of 7.5 kDa. A weight average molecular weight by gel filtration chromatography was 11,000.

(3) Synthesis of PS Particles (AK085) Using Amine-Based Polymerization Initiator VA-044

A separable baffled 1 L flat bottom flask was used. A stirring blade (AS ONE, product number 1-7732-04) with a rotating blade diameter of ⌀40 mm was set on a mechanical stirrer and the separable flask was assembled, 404 mL of ultrapure water was added therein, and the liquid temperature was controlled to become 60° C. with a mantle heater. In a state where only water is present, nitrogen bubbling was performed for 30 minutes or longer under stirring at 450 rpm. Thereafter, 10% (v/v) ethanol and, at the same time, 3.0 g (3.3 mL, 64 mM) of styrene were added, subsequently 250.17 mg (2.05 mM) of VA-044 dissolved in 2 mL of ultrapure water was added dropwise, the flask was closed tightly, and the reaction was started. After a lapse of 16 hours, the reaction was stopped. After the reaction, the monomer and ethanol were evaporated and concentrated by an evaporator. The residue was dialyzed for 1 day (water exchange: 3 times) with a dialysis membrane with MWCO of 7.5 kDa. The weight average molecular weight by gel filtration chromatography was 13,000.

(4) Preparation of Coated Glass

In a 1.0% (w/v) aqueous sodium hydroxide solution, a glass plate with a size of 5×5 cm and a thickness of 3 mm was immersed for 30 minutes or longer to be subjected to hydrophilization, and thereafter a polystyrene particle suspension corresponding to an amount of 30 or 80 nmol was placed on the glass plate so that its whole surface was coated. The coating amount (nmol) was calculated by dividing the weight of the polymer coated by the weight average molecular weight obtained from gel filtration chromatography. The glass plate, which was dried naturally and, thereafter, subjected to dry heat sterilization at 140° C. for 1 hour with the PS particles melted, was used as a sample.

(5) Antimicrobial Test of Coated Glass

The antimicrobial test method was in accordance with JIS Z 2801:2010, "Antibacterial products-Test for antibacterial activity and efficacy." As the bacterial species, there was used *Staphylococcus aureus* subsp. *aureus* NBRC 12732. Physical properties of polystyrene particles, which were synthesized by the above-mentioned method, are shown in Table 11. The average particle diameter (dDLS), PdI, and an average zeta potential were measured by Zetasizer Nano ZSP (Malvern). The antibacterial activity of the glass plates coated with these polystyrene particle samples was evaluated. As a comparative control, uncoated glass plate was also evaluated for antibacterial activity in the same manner.

TABLE 11

Physical properties and coating conditions of polystyrene particle samples subjected to antimicrobial tests

| Sample | Initiator | dDLS (nm) | PdI | Average zeta potential (mV) | Yield (%) |
|---|---|---|---|---|---|
| AK145-2 | V-50 | 199 | 0.09 | 57.2 | 25 |
| AK085 | VA-044 | 76 | 0.06 | 56.4 | 13 |
| AK057 | ADIP | 180 | 0.02 | 27.8 | 3 |

Table 12 shows antibacterial activity values calculated from the antimicrobial test results of each coated glass plate prepared, according to Math. 1 in Example 3-1. In addition, the antibacterial activity value of the uncoated glass plate was 0.

TABLE 12

Coating conditions and antibacterial activity values of polystyrene particle samples

| Sample | Initiator | Coating amount (nmol) | Antibacterial activity value |
|---|---|---|---|
| AK145-2 | V-50 | 30 | 0.2 |
| AK085 | VA-044 | 30 | 0 |
| AK057 | ADIP | 30 | 4.2 |
| AK145-2 | V-50 | 80 | 0 |
| AK085 | VA-044 | 80 | 0.5 |
| AK057 | ADIP | 80 | >4.6 |

As shown in Table 12, when the antibacterial activity of PS particles with Mw of around 10,000 obtained with V-50, VA-044, and ADIP were compared under a condition of the same coating molar amount, the antibacterial activity was confirmed only with PS particles using ADIP as an initiator. Furthermore, even when the coating amount (nmol) was increased, no antibacterial activity was observed with PS particles synthesized by using V-50 and VA-044. Further, glass plates, on which the PS particles synthesized by using ADIP were coated in a range of amounts of 30 to 80 nmol, all showed strong antibacterial activity with antibacterial activity values of 4 or more.

Example 6-4

Antimicrobial Test of Glass Coated with Polystyrene (PS) Particles Having Weight Average Molecular Weight of about 50.000 to 60.000. Synthesized by Using Other Amine-Based Polymerization Initiators (1) Synthesis of PS Particles (AK115') Using Cationic Polymerization Initiator ADIP Ultrapure water was nitrogen-purged for 30 minutes or longer. In a vial of 30 mL, 27 mL of ultrapure water was placed and heated to 60° C. After heating in a hot water bath for about 15 minutes, ethanol of 9% (v/v) relative to the total liquid volume was added, and 64 mM of styrene and 2.05 mM of an aqueous ADIP solution were added in this order. Stirring was started with a multi-point hot stirrer (Tokyo Glass Kikai, product number F-616H). The vial was taken out 4 hours thereafter and ethanol was evaporated in a hood. Dialysis was performed for 1 day with a dialysis membrane with MWCO of 7.5 kDa. The weight average molecular weight by gel filtration chromatography was 60,000.

(2) Synthesis of PS Particles (AK084') Using Amine-Based Polymerization Initiator V-50

A separable baffled 1 L flat bottom flask was used. A stirring blade (AS ONE, product number 1-7732-04) with a rotating blade diameter of ⌀40 mm was set on a mechanical stirrer and the separable flask was assembled, 404 mL of ultrapure water was added therein, and the liquid temperature was controlled to 60° C. with a mantle heater. Nitrogen bubbling was performed for 30 minutes or longer under stirring at 450 rpm, and 45 mL of ethanol was added by a syringe. Thereafter, 3.0 g (3.3 mL, 64 mM) of styrene was added, subsequently 250.17 mg (2.05 mM) of V-50 dissolved in 1 mL of ultrapure water was added dropwise, and the reaction was started under a nitrogen atmosphere. After a lapse of 16 hours, the reaction was stopped, styrene and ethanol were removed and concentrated by an evaporator, and a residual sample was dialyzed with a dialysis membrane with MWCO of 7.5 kDa for 1 day, which was taken as a purified sample. Its weight average molecular weight by gel filtration chromatography was 52,000.

(3) Synthesis of PS Particles (AK136-1) Using Amine-Based Polymerization Initiator VA-044

Ultrapure water had been nitrogen-purged for 30 minutes or longer beforehand. To a vial, there were added 18 mL of ultrapure water, 9% (v/v) ethanol, 280 mM of styrene, and 2.05 mM of an aqueous VA-044 solution. The reaction was carried out at 70° C. for 3 hours while stirring with a multi-stirrer (Iuchi Seieido Co., product number MSR-12). After evaporating ethanol in a hood, dialysis was performed for 1 day (water exchange: 3 times) with a dialysis membrane with MWCO of 7.5 kDa. The weight average molecular weight by gel filtration chromatography was 55,000.

(4) Preparation of Coated Glass

In a 1.0% (w/v) aqueous sodium hydroxide solution, a glass plate with a size of 5×5 cm and a thickness of 3 mm was immersed for 30 minutes or longer to be hydrophilized, and a polystyrene particle suspension of an amount corresponding to 45 nmol was placed on the glass plate so that its whole surface was coated. The molar coating amount was calculated by dividing the weight of the polymer coated by the weight average molecular weight obtained by gel filtration chromatography. The glass plate, which was dried naturally and, thereafter, subjected to dry heat sterilization at 140° C. for 1 hour with the PS particles melted, was used as a sample.

(5) Antimicrobial Test of Coated Glass

The antimicrobial test method was in accordance with JIS Z 2801:2010, "Antibacterial products-Test for antibacterial activity and efficacy." As the bacterial species, there was used *Staphylococcus aureus* subsp. *aureus* NBRC 12732. Physical properties of the polystyrene particles synthesized by the above-mentioned method are shown in Table 13. The antibacterial activity of the glass plates coated with these polystyrene particle samples was evaluated. As a comparative control, uncoated glass plate was also evaluated for antibacterial activity in the same manner.

TABLE 13

Physical properties of polystyrene particle samples subjected to antimicrobial tests

| Sample | Initiator | dDLS (nm) | PdI | Average zeta potential (mV) | Yield (%) |
|---|---|---|---|---|---|
| AK084 | V-50 | 132 | 0.03 | 49.5 | 24 |
| AK136-1 | VA-044 | 106 | 0.03 | 47.3 | 15 |
| AK115 | ADIP | 281 | 0.11 | 42.5 | 16 |

Table 14 shows antibacterial activity values calculated from the antimicrobial test results of each coated glass plate prepared, according to the Math. 1 in Example 3-1. In addition, the antibacterial activity value of the uncoated glass plate was 0.

TABLE 14

Coating conditions and antibacterial activity values of polystyrene particle samples

| Sample | Initiator | Coating amount (nmol) | Antibacterial activity value |
|---|---|---|---|
| AK084 | V-50 | 45 | 0 |
| AK136-1 | VA-044 | 45 | 0 |
| AK115 | ADIP | 45 | 2.8 |

As shown in Table 14, when the antibacterial activity of PS particles with Mw of from 50,000 to 60,000 obtained with V-50, VA-044, and ADIP were compared under a condition of the same coating molar amount, the antibacterial activity was confirmed only with PS particles using ADIP as an initiator.

From the results of Table 12 and Table 14, among PS particles of any molecular weight, synthesized by using V-50, VA-044, and ADIP, antibacterial activity was shown only by ADIP. Therefore, it was thought that manifestation of antibacterial activity is a property specific to ADIP.

Example 6-5

Antimicrobial Test Using Polychlorostyrene Particle-Coated Glass (1) Synthesis of Polychlorostyrene Particles (TT105) Using Cationic Polymerization Initiator ADIP and Preparation of Coated Glass Ultrapure water had been nitrogen-purged for 30 minutes or longer beforehand. To a vial, there were added 27 mL of ultrapure water, 9% (v/v) ethanol, 16 mM of 4-chlorostyrene, and 2.05 mM of an aqueous ADIP solution. The reaction was carried out at 70° C. for 3 hours while stirring with a magnetic stirrer. After performing a centrifugal treatment at 40,000×g for 2 hours, the supernatant was carefully recovered and resuspended in 5 mL of ultrapure water. TT105 had a particle diameter of 216 nm, PdI, which represents dispersibility, of 0.02, and a zeta potential of 51.6 mV, and its yield was 26%. The purified TT105 particle suspension of 3 mL was placed on a 5 cm square glass plate that had been alkali-washed with 1 N NaOH. The glass plate, which was dried naturally and, thereafter, subjected to a heat treatment at 140° C. for 1 hour with the PS particles heat fused, was used as a sample for antibacterial testing.

(2) Antimicrobial Test of Coated Glass

The antimicrobial test method was in accordance with JIS Z 2801:2010, "Antibacterial products-Test for antibacterial activity and efficacy." As the bacterial species, there was used Staphylococcus aureus subsp. aureus NBRC 12732. The antibacterial activity of the glass plate coated with TT105 was evaluated. As a comparative control, uncoated glass plate was also evaluated for antibacterial activity in the same manner. An antibacterial activity value calculated from the antimicrobial test results of each coated glass plate prepared, according to the Math. 1 in Example 3-1 was 3.6. In addition, the antibacterial activity value of the uncoated glass plate was 0. From this result, it has been found that, in addition to polystyrene, use of a polystyrene derivative provides extremely high antibacterial activity.

Example 7

Safety Test of Polystyrene-Coated Glass (Human-Derived Cell Proliferation Test)

Toxicity to human cells were evaluated by using the cationic polystyrene particles AK057 which was synthesized in Example 6-1. The toxicity evaluation was performed through metabolic activity of cells by WST-1 assay (TaKaRa Premix WST-1 Cell Proliferation Test System, manufactured by Takara Bio Inc.). HeLa cells derived from human cervical cancer were seeded on a 96 well plate at a concentration of $1 \times 10^4$ cells/well (medium amount: 100 μL) and, at the same time, the suspension of AK057 was added so that the concentration of AK057 became 20 μg/mL and 40 μg/mL. After culturing at 37° C. for 24 hours under 5% $CO_2$, Premix WST-1 was added in an amount of 10 μl/well and incubation was performed for 60 minutes at 37° C. Absorbance at 440 nm was measured, and the specific survival/proliferation rate (%) was calculated by setting the absorbance, when AK057 was not added, to a survival rate of 100%. The results are shown in Table 15.

TABLE 15

Safety test results of cationic PS particles for human cells

| Addition concentration of AK057 (μg/mL) | Specific survival/proliferation rate*[1] (%) |
|---|---|
| 20 | 103.3 ± 1.0 |
| 40 | 99.4 ± 2.9 |

*[1]average ± (standard deviation) (N = 3)

As shown in Table 15, even when AK057 was added at the start of culture, the number of human cells did not change and, thus, it has been confirmed that AK057 has no toxicity.

Further, in Example 6-1 in which antibacterial activity against fungi was examined, the amount of AK057 applied to the glass plate was 28 μg/cm², and in the toxicity test of human cells in the present Example, the amount of AK057 per area of the bottom of the Petri dish, where the cells proliferate, amounted to 12.5 μg/cm² in the 40 μg/mL addition group. Thus, the amounts of addition of AK057 in both cases are of the same level. That is, it has been confirmed that the cationic polystyrene particles AK057 have a high proliferation inhibitory effect and a killing effect on microorganisms, but are safe to human cells.

The invention claimed is:

1. An additive for imparting an antimicrobial property to a resin, comprising a string polymer, at least one terminal of which has a positive charge, wherein the string polymer is a polymer containing structural units derived from a cationic polymerization initiator and a monomer containing a carbon-carbon double bond, wherein the resin is a thermoplastic resin and/or a thermosetting resin, wherein the thermosetting resin is one or more resins selected from the group consisting of phenol resins, epoxy resins, urethane resins, melamine resins, urea resins, alkyd resins, unsaturated polyester resins, and silicone resins.

2. The additive according to claim 1, wherein the cationic polymerization initiator is a compound having a chemical structure of general formula (I):

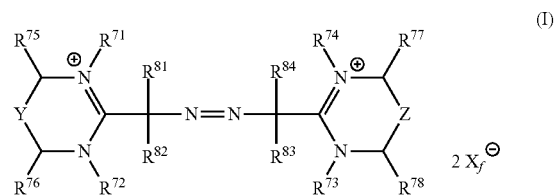

wherein,
Y represents a single bond or $CR^{85}$;
Z represents a single bond or $CR^{86}$;
$R^{72}$, $R^{73}$, $R^{75}$, $R^{76}$, $R^{77}$, $R^{78}$, $R^{85}$, and $R^{86}$ are each independently selected from the group consisting of hydrogen atom, $C_{1-6}$ alkyl, $C_{1-6}$ alkoxy, $C_{1-6}$ alkyl carbonyl, phenyl, and hydroxy, wherein the $C_{1-6}$ alkyl, $C_{1-6}$ alkoxy, $C_{1-6}$ alkyl carbonyl and phenyl may further be substituted with one or two substituents selected from the group consisting of $C_{1-6}$ alkyl, $C_{1-6}$ alkoxy, $C_{1-6}$ alkyl carbonyl, phenyl, and hydroxy;
$R^{72}$ and $R^{73}$ may further each independently represent adamantyl or $C_{1-6}$ alkyl substituted with $Si(OCH_3)_2(CH_3)$;
or $R^{75}$ and $R^{76}$, or $R^{77}$ and $R^{78}$ may together form $-(CH_2)_{3-5}-$;
$R^{81}$, $R^{82}$, $R^{83}$, and $R^{84}$ are substituents selected from the group consisting of $C_{1-4}$ alkyl, $C_{1-4}$ alkyl carbonyl, and $C_{1-3}$ alkoxy, wherein the $C_{1-4}$ alkyl may be substituted with one $C_{1-3}$ alkoxy group;
$R^{71}$ and $R^{74}$ are each independently a $C_{1-3}$ alkyl group; and
$X_f^-$ is a counter anion.

3. The additive according to claim 1, wherein the cationic polymerization initiator is 2,2'-azobis-(2-(1,3-dimethyl-4,5-dihydro-1H-imidazol-3-ium-2-yl))propane triflate (ADIP).

4. The additive according to claim 1, wherein the monomer containing a carbon-carbon double bond is a vinyl compound monomer.

5. The additive according to claim 1, wherein the monomer containing a carbon-carbon double bond is one or more compounds selected from the group consisting of acrylamides, methacrylamides, acrylic acids, esters of acrylic acids, methacrylic acids, esters of methacrylic acids, styrenes, and vinyl acetate.

6. The additive according to claim 1, wherein the monomer containing a carbon-carbon double bond is one or more compounds selected from the group consisting of styrene and methyl methacrylate (MMA).

7. The additive according to claim 6, wherein the monomer containing a carbon-carbon double bond comprises styrene and methyl methacrylate (MMA).

8. The additive according to claim 7, wherein the monomer containing a carbon-carbon double bond is methyl methacrylate (MMA).

9. The additive according to claim 2, wherein $R^{75}$ and $R^{76}$, or $R^{77}$ and $R^{78}$, in formula (I) together form $-(CH_2)_4-$.

10. A method for producing an antimicrobial resin molded body, comprising the steps of: mixing the additive according to claim 1 with the resin; and molding the mixture.

11. An antimicrobial resin molded body, formed by mixing the additive according to claim 1 with the resin; and molding the mixture.

12. The antimicrobial resin molded body according to claim 11, in the product forms as building materials, food storage containers, medical setting supplies, kitchen supplies, toiletry supplies, stationeries, home appliances, or other everyday goods.

13. An antimicrobial coating material comprising polymer particles with their surfaces covered with positive charges, wherein the polymer particles comprise a copolymer containing structural units derived from a cationic polymerization initiator and a monomer containing a carbon-carbon double bond, wherein the monomer containing a carbon-carbon double bond comprises methyl methacrylate (MMA).

14. The antimicrobial coating material according to claim 13, wherein the polymer particles comprise a copolymer containing structural units derived from a cationic polymerization initiator, a monomer containing a carbon-carbon double bond, and a crosslinking agent.

15. The antimicrobial coating material according to claim 13, wherein the cationic polymerization initiator is a compound having a chemical structure of general formula (I):

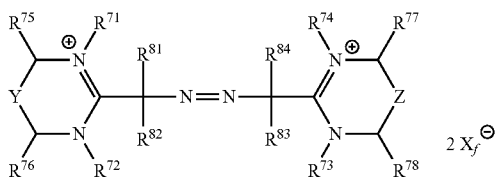

wherein,
Y represents a single bond or $CR^{85}$;
Z represents a single bond or $CR^{86}$;
$R^{72}$, $R^{73}$, $R^{75}$, $R^{76}$, $R^{77}$, $R^{78}$, $R^{85}$, and $R^{86}$ are each independently selected from the group consisting of hydrogen atom, $C_{1-6}$ alkyl, $C_{1-6}$ alkoxy, $C_{1-6}$ alkyl carbonyl, phenyl, and hydroxy, wherein the $C_{1-6}$ alkyl, $C_{1-6}$ alkoxy, $C_{1-6}$ alkyl carbonyl and phenyl may further be substituted with one or two substituents selected from the group consisting of $C_{1-6}$ alkyl, $C_{1-6}$ alkoxy, $C_{1-6}$ alkyl carbonyl, phenyl, and hydroxy;
$R^{72}$ and $R^{73}$ may further each independently represent adamantyl or $C_{1-6}$ alkyl substituted with $Si(OCH_3)_2$ $(CH_3)$;
or $R^{75}$ and $R^{76}$, or $R^{77}$ and $R^{78}$ may together form $-(CH_2)_{3-5}-$;
$R^{81}$, $R^{82}$, $R^{83}$, and $R^{84}$ are substituents selected from the group consisting of $C_{1-4}$ alkyl, $C_{1-4}$ alkyl carbonyl, and $C_{1-3}$ alkoxy, wherein the $C_{1-4}$ alkyl may be substituted with one $C_{1-3}$ alkoxy group;
$R^{71}$ and $R^{74}$ are each independently a $C_{1-3}$ alkyl group; and
$X_f^-$ is a counter anion.

16. The antimicrobial coating material according to claim 13, wherein the cationic polymerization initiator is 2,2'-azobis-(2-(1,3-dimethyl-4,5-dihydro-1H-imidazol-3-ium-2-yl))propane triflate (ADIP).

17. The antimicrobial coating material according to claim 13, wherein the monomer containing a carbon-carbon double bond further comprises a vinyl compound monomer.

18. The antimicrobial coating material according to claim 13, wherein the monomer containing a carbon-carbon double bond further comprises one or more compounds selected from the group consisting of acrylamides, methacrylamides, acrylic acids, esters of acrylic acids, methacrylic acids, esters of methacrylic acids, styrenes, and vinyl acetate.

19. The antimicrobial coating material according to claim 13, wherein the monomer containing a carbon-carbon double bond further comprises one or more compounds selected from the group consisting of styrene and styrene derivative.

20. The antimicrobial coating material according to claim 13, wherein the monomer containing a carbon-carbon double bond is methyl methacrylate (MMA).

21. The antimicrobial coating material according to claim 14, wherein the cross-linking agent is N,N'-methylenebisacrylamide (MBAM) and/or divinylbenzene.

22. An antimicrobial coating material comprising polymer particles with their surfaces covered with positive charges, wherein the polymer particles comprise a copolymer containing structural units derived from a cationic polymerization initiator and a monomer containing a carbon-carbon double bond, further comprising a resin and a solvent.

23. The antimicrobial coating material according to claim 22, wherein the resin is one or more resins selected from the group consisting of acrylic resins, urethane resins, silicone resins, and fluororesins.

24. The antimicrobial coating material according to claim 22, wherein the solvent is one or more solvents selected from the group consisting of water, oil, thinner, and alcohol.

25. A method for imparting an antimicrobial property to a resin, comprising mixing
(i) an additive comprising a string polymer, at least one terminal of which has a positive charge, wherein the string polymer is a polymer containing structural units derived from a cationic polymerization initiator and a monomer containing a carbon-carbon double bond, and
(ii) a resin,
to impart an antimicrobial property to the resin,
wherein the cationic polymerization initiator is a compound having a chemical structure of general formula (I):

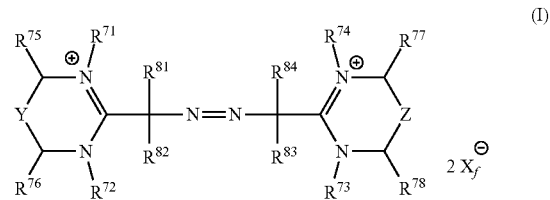

wherein,
- Y represents a single bond;
- Z represents a single bond;
- $R^{72}$, $R^{73}$, $R^{75}$, $R^{76}$, $R^{77}$, and $R^{78}$ are each independently selected from the group consisting of hydrogen atom and $C_{1-6}$ alkyl;
- $R^{81}$, $R^{82}$, $R^{83}$, and $R^{84}$ are each independently a $C_{1-4}$ alkyl group;
- $R^7$ and $R^{74}$ are each independently a $C_{1-3}$ alkyl group; and
- $X_f^-$ is a counter anion.

26. A method for making an antimicrobial coating material, comprising mixing
   (i) polymer particles with their surfaces covered with positive charges, wherein the polymer particles comprise a copolymer containing structural units derived from a cationic polymerization initiator and a monomer containing a carbon-carbon double bond, with
   (ii) a resin, and
   (iii) a solvent to produce an antimicrobial coating material,
   wherein the cationic polymerization initiator is a compound having a chemical structure of general formula (I):

wherein,
- Y represents a single bond;
- Z represents a single bond;
- $R^{72}$, $R^{73}$, $R^{75}$, $R^{76}$, $R^{77}$, and $R^{78}$ are each independently selected from the group consisting of hydrogen atom and $C_{1-6}$ alkyl;
- $R^{81}$, $R^{82}$, $R^{83}$, and $R^{84}$ are each independently a $C_{1-4}$ alkyl group;
- $R^{71}$ and $R^{74}$ are each independently a $C_{1-3}$ alkyl group; and
- $X_f^-$ is a counter anion.

* * * * *